W. P. PENN.
Grain Drill.
No. 59,639.
2 Sheets—Sheet 1.
Patented Nov. 13, 1866.
Fig. 1.
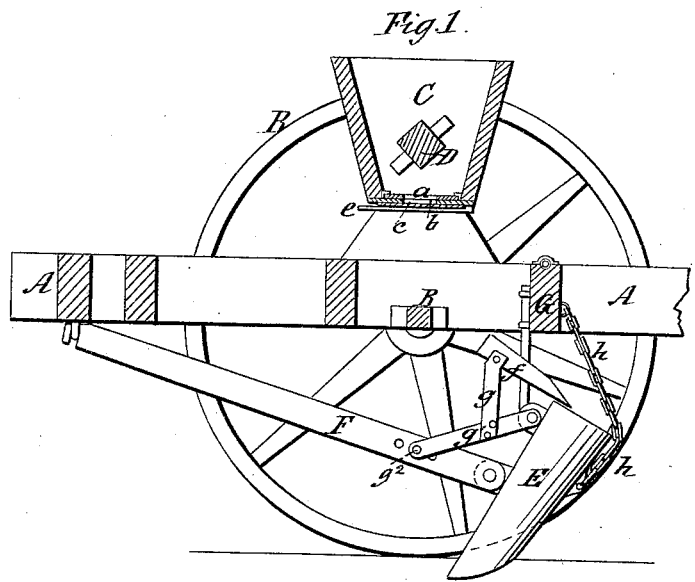
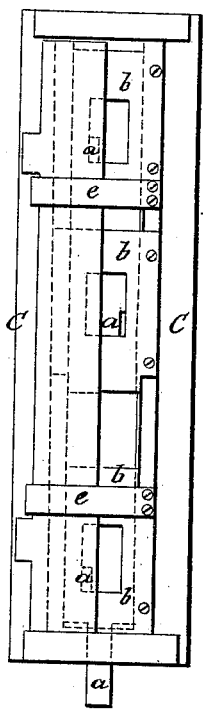
Fig. 4.
Fig. 2.
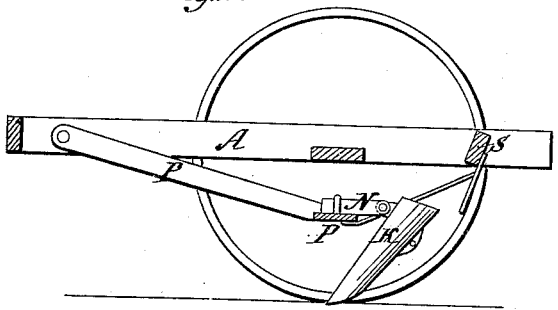
Fig. 5.
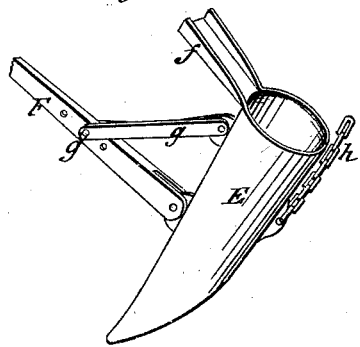
Fig. 3.
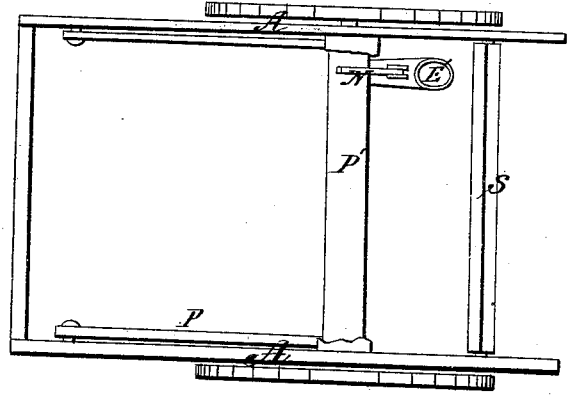
Witnesses.
R. T. Campbell
E. Schafer
Inventor
Wm. P. Penn
by his Attys
Mason Fenwick & Lawrence W. P. PENN.
Grain Drill.

No. 59,639.

2 Sheets—Sheet 2.

Patented Nov. 13, 1866.

Witnesses
R. T. Campbell
P. Schafer

Inventor
Wm. P. Penn
by his Attys.
Mason Fenwick & Lawrence

UNITED STATES PATENT OFFICE.

WORDEN P. PENN, OF BELLEVILLE, ILLINOIS.

IMPROVEMENT IN SEEDING-MACHINES.

Specification forming part of Letters Patent No. 59,639, dated November 13, 1866.

*To all whom it may concern:*

Be it known that I, WORDEN P. PENN, of Belleville, St. Clair county, State of Illinois, have invented a new and Improved Seeding-Machine; and I do hereby declare that the following is a full, clear, and exact description thereof, reference being had to the accompanying drawings, making a part of this specification, in which—

Figure 6:
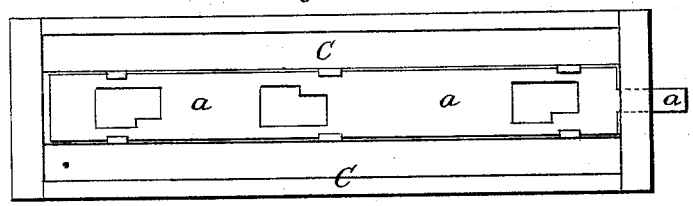
Figure 7:
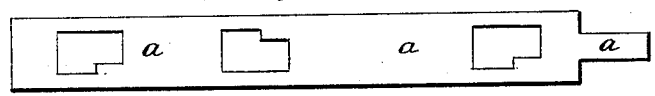
Figure 8:
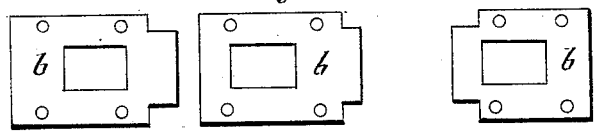
Figure 9:
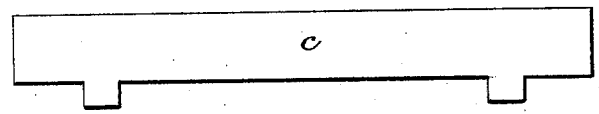

Figure 1 is a longitudinal section through a seeding-machine having my improvements applied to it. Fig. 2 is a longitudinal section of the carriage of a seeding-machine, showing the teeth applied to a swinging frame. Fig. 3 is a top view of Fig. 2. Fig. 4 is a bottom view of the hopper, showing the adjustable seed-discharging slides. Fig. 5 is a perspective view of a tooth attached to a swinging bar. Fig. 6 is a top view of the hopper. Fig. 7 is a top view of the seed-plate $a$. Fig. 8 shows a top view of the several plates $b$, one for each seed-tube.

Similar letters of reference indicate corresponding parts in the several figures.

My improvements relate to applying adjustable slides to the bottom of a hopper, for the purpose of adapting the discharge-openings through said bottom to different varieties of seed, and to discharge the desired quantity of seed in a given time. Also, to a method of applying the teeth through which the seed are discharged or conducted into the earth to pivoted bars, so that they will be firmly braced, and so that they may be adjusted and set at different angles with respect to the ground. Also, to the application of chutes or conveyers to the upper ends of the teeth, for conducting the seed flowing from the hopper directly into these teeth. Also, to a novel method of applying the drag-bars of the teeth of seeding-machines to the frame of the transporting-wheels, all as will be hereinafter described.

To enable others skilled in the art to make and use my invention, I will describe its construction and operation.

In the accompanying drawings, Fig. 1, A represents the frame of the machine, which may be constructed in any suitable manner, and which is mounted upon transporting-wheels B B. Upon this frame A, and extending transversely across it, near the axle-tree B', is a hopper, C, which is to contain the seed for distribution. The bottom of this hopper is composed of several plates, $a$ $b$ $c$, shown in Figs. 1 and 4. The plate $a$, which is nearest the seed in the hopper, or which is the uppermost plate, is perforated at suitable intervals along its length, which perforations are oblong, but somewhat in the form of the letter L—*i. e.*, one portion of the width of each opening is greater than that of another portion, as shown in Fig. 4. Plate $a$ is longitudinally adjustable, and may be adjusted by screws or otherwise. Beneath the plate $a$ are several plates $b$, having rectangular oblong openings through them, as shown in Fig. 4; and beneath these stationary plates $b$ $b$ $b$ is a sliding plate, $c$, (also shown in Fig. 4,) which is supported by the straps $e$ $e$, and which is of sufficient length to close the openings through the bottom of the seed box or hopper C, when this plate is moved back or forward, as the case may be, beneath said openings. The slide $c$ serves the purpose of a cut-off for said openings, and it may be adjusted in any convenient manner.

By means of the above-described combination of fixed and movable plates, constructed as shown, and applied to the bottom of a seed-box, C, I can obtain a small square or rectangular opening, or an oblong opening, with one part of such opening wider than the other part; and by this means I am enabled to vary the width as well as the length of the openings of the plate $a$ according to the size of the seed or the flow required. The holes of plate $a$ are so disposed or arranged that the decreasing offsets of the holes alternately come on opposite sides of the vertical axis of the hopper.

The arrangement of the plates and form of the holes therein enable me to exercise full control over the discharging mechanism for the seed, and to effect a rapid or slow flow of the seed, as circumstances require.

The agitator D consists of a shaft which extends through the hopper C in a direction with its length, and which is provided with a number of projecting pins for stirring the seed in said hopper and keeping the discharge-openings clear. This agitator may be rotated or oscillated by means of gearing communicating with the transporting-wheels. The arrangement of the spurs or pins on said agitator may vary according to the motion which is given to it.

After leaving the hopper C, the seed are conducted into a trough or chute, $f$, which is formed on or rigidly applied to the upper end of the tooth E. In practice a number of such teeth will be employed corresponding to the number of discharge-openings in the bottom of the hopper. I have represented and shall describe but one of these teeth.

The chute $f$ is supported at or near its forward end by means of a standard, $g$, which is secured to a brace, $g^1$, that connects the upper end of the tooth E to the drag-bar F, as shown in Figs. 1 and 5. At an intermediate point between the ends of the tooth E the rear end of the drag-bar F is pivoted to this tooth. The diagonal brace $g^1$ is arranged above the drag-bar, and pivoted both to this bar and to the tooth, so as to constitute an upper brace and also a support for the forward or upper end of the chute $f$. Several holes are made through the drag-bar F, near the forward end of the brace $g^1$, for the purpose of enabling me to adjust the tooth and set it at different angles. If desirable, a wooden-pin, $g^2$, may be used, which will break and prevent the tooth or its appendages from being injured should the point of this tooth meet with any great obstruction in its path. The drag-bar F, to which the tooth E is applied, is pivoted to the forward cross-beam of frame A, so that the tooth may rise or fall and accommodate itself to an uneven surface as the machine is moved along, and also so that the tooth may be elevated free from the ground whenever it is desired. The rocking beam G, which extends transversely across the frame A in rear of the hopper C, is attached to the tooth E by means of a chain or strap, $h$, and when this beam is moved upward it will elevate the tooth. A handle or lever or other contrivance may be applied to said beam for the purpose of enabling the attendant to move it and retain it in the desired position.

The tooth E may be constructed with an open bottom, in the usual manner of making teeth for seeding-machines, and it may be made of thin metal fashioned in the tubular form represented in Figs. 1 and 4; or tooth E may be cast metal.

In Figs. 2 and 3 I have represented a tooth, E', connected to a short bar, N, which is pivoted at its forward end, in any suitable manner, to a swinging frame, P, or to the transverse beam P' of such frame. The arms of this frame are pivoted at their forward ends to the longitudinal beams of the main frame A in such manner that the beam P', together with these arms, can rise and fall and allow the tooth E' to accommodate itself to inequalities in the surface of the ground passed over. This frame P P' may be connected by chains to a rocking beam, S, which is constructed and applied to frame A in the manner described for the beam G of Fig. 1.

By the employment of a vibrating frame, P P', for the teeth of a seeding-machine considerable amount of stock is saved, and still all the teeth can have independent pivot-joints, so that one can rise and pass over an obstruction without lifting the others out of working position.

All the teeth have their support upon the transverse beam P', and consequently, when this beam is elevated or depressed, the teeth will receive a corresponding movement. With such a frame I dispense with the long drag-bars for each tooth, as shown in Fig. 1, and use but two bars to sustain the beam P'. The machine can consequently be made much lighter and cheaper by the employment of such a frame.

Having thus described my invention, what I claim as new, and desire to secure by Letters Patent, is—

1. Sustaining the forward end of the chute $f$ upon the brace $g'$ of the tooth E, when said brace is arranged above the drag-bar F, substantially as described.

2. The combination of the brace $g'$ with the drag-bar F and tooth E, said brace being located above the drag-bar and pivoted to it and the upper end of the tooth, substantially as described.

W. P. PENN.

Witnesses:
JOHN H. MAYOE,
LEE HUHS,
AMMON H. LUTZ.